(12) United States Patent
Chen et al.

(10) Patent No.: US 7,873,284 B2
(45) Date of Patent: Jan. 18, 2011

(54) QUADRATURE AMPLITUDE MODULATION OF OPTICAL CARRIERS

(75) Inventors: Young-Kai Chen, Berkeley Heights, NJ (US); Andreas Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 819 days.

(21) Appl. No.: 10/830,331

(22) Filed: Apr. 22, 2004

(65) Prior Publication Data

US 2005/0238367 A1 Oct. 27, 2005

(51) Int. Cl.
*H04B 10/12* (2006.01)
(52) U.S. Cl. .................................................... 398/183
(58) Field of Classification Search .......... 398/46, 398/65, 74, 81, 147, 174, 176, 188, 199, 398/183; 704/223; 455/73; 340/7.1, 7.63; 385/3, 16
See application file for complete search history.

(56) References Cited

U.S. PATENT DOCUMENTS

| | | | |
|---|---|---|---|
| 5,050,948 A | 9/1991 | Hawkins, II et al. | 385/2 |
| 5,644,417 A * | 7/1997 | Aulet et al. | 398/32 |
| 6,658,174 B2 | 12/2003 | Doerr | 385/16 |
| 6,711,308 B2 | 3/2004 | Erben et al. | 385/3 |
| 6,882,758 B2 * | 4/2005 | Betty | 385/9 |
| 7,027,669 B2 * | 4/2006 | Leuthold et al. | 385/3 |
| 2002/0003641 A1 * | 1/2002 | Hall et al. | 359/122 |
| 2002/0136318 A1 * | 9/2002 | Gorokhov et al. | 375/261 |
| 2004/0021829 A1 * | 2/2004 | Griffin | 353/30 |
| 2004/0028418 A1 * | 2/2004 | Kaplan et al. | 398/188 |
| 2004/0096143 A1 * | 5/2004 | Shpantzer et al. | 385/16 |
| 2004/0208647 A1 * | 10/2004 | Gill et al. | 398/188 |

FOREIGN PATENT DOCUMENTS

| | | |
|---|---|---|
| EP | 1271812 A2 | 1/2003 |
| GB | 2383707 B | 7/2003 |
| JP | 63013017 | 1/1988 |
| JP | 3179939 | 8/1991 |
| JP | 2000162561 | 6/2000 |
| JP | 2004252386 | 9/2004 |
| JP | 2004252386 A | 9/2004 |

OTHER PUBLICATIONS

U.S. Appl. No. 10/443,328, filed May 22, 2003, Leven, A.

(Continued)

*Primary Examiner*—Quan-Zhen Wang
*Assistant Examiner*—Shaheda A Abdin
(74) *Attorney, Agent, or Firm*—Alex Yip (57) ABSTRACT

An apparatus includes an optical splitter, an optical combiner, first and second optical paths, and a digital signal generator. The optical splitter has an input port and first and second output ports. The optical combiner has first and second input ports and an output port. The first optical path couples the first output port of the splitter to the first input port of the combiner. The second optical path couples the second output port of the splitter to the second input port of the combiner. Each optical path includes an electro-optical phase shifter, and one of the optical paths includes an electro-optical attenuator. The digital signal generator is configured to apply binary-valued voltage signals to control inputs of the phase shifters and the attenuator.

16 Claims, 6 Drawing Sheets

OTHER PUBLICATIONS

Griffin, R.A., Johnstone, R.I., Walker, R.G., Hall, J. Wadsworth, S.D., Berry, K,, Carter, A.C., Wale, M.J., Hughes, J., Jerrram, P.A. Parsons, N.J., *Gb/s Optical Differential Quadrature Phase Shift Key (DQPSK) Transmission Using GaAs/AlGaAs Integration*, 2002 Optical Society of America, FD6-1, FD6-3.

Japanese Kokai Patent Application No. JP2000-162561, Publication Date Jun. 16, 2000, "Optical Subcarrier Phase Modulator And Optical Spectrum Diffusion Transmitter", Seiji Fukushima et al., Translated from Japanese, pp. 1-36.

Japanese Kokai Patent Application No. Hei 3[1991]-179939A, Publication Date Aug. 5, 1991, "Multiphase Phase Modulator", Shigeki Watanabe et al., Translated from Japanese, pp. 1-25.

* cited by examiner

QUADRATURE AMPLITUDE MODULATION OF OPTICAL CARRIERS

BACKGROUND

1. Field of the Invention

This invention relates to modulation of optical carriers.

2. Description of the Related Art

Many conventional optical modulators implement binary ON/OFF keying modulation schemes. The binary ON/OFF keying modulation schemes encode one data bit onto an optical carrier per coding interval. While such modulation schemes are straightforward to implement, it is often desirable to encode more than one data bit onto the optical carrier per coding interval, e.g., to support a higher data rate.

Figure 1:
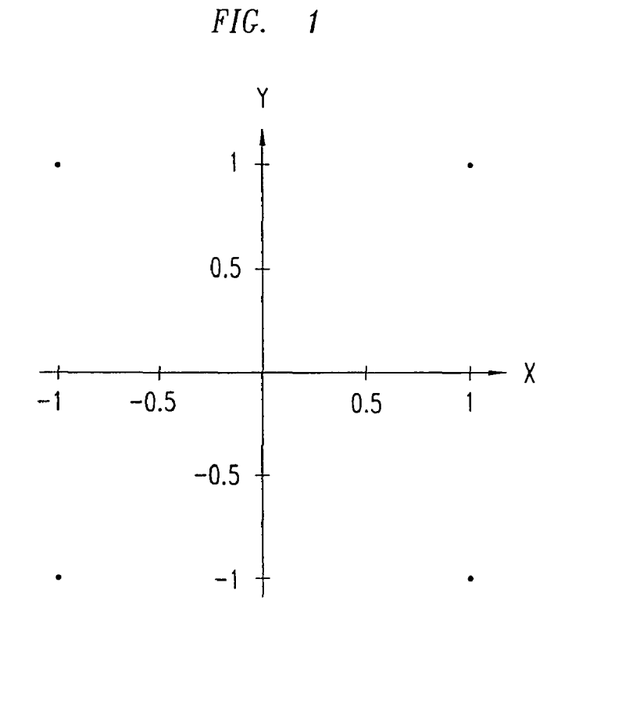
FIG. 1 show a quadrature phase shift keying (QPSK) constellation that is implemented in prior art optical modulators.

Other conventional optical modulators implement a quadrature phase shift keying (QPSK) modulation scheme. The QPSK modulation scheme encodes two data bits onto an optical carrier per symbol interval thereby producing the constellation of signal points shown in FIG. 1. In the QPSK constellation, each signal point has x and y components of the same magnitude. The various signal points of the QPSK constellation are related by reflections about the x-axis and/or the y-axis. In the QPSK modulation scheme, the optical carrier's in-phase and quadrature-phase components represent the x-coordinates and the y-coordinates of the signal points.

The conventional QPSK optical modulator includes a Mach-Zehnder interferometer (MZI). The MZI has two arms whose optical path lengths differ by ¼ of the optical carrier's wavelength up to integer multiples of the wavelength. Each arm of the MZI includes an electro-optically controlled phase shifter, i.e., an MZI. The phase shifters generate phase shifts of 0 or $\pi$ on the optical carrier in response to the binary voltage values of the digital signals being encoded. In the QPSK optical modulator, one arm of the MZI encodes one data bit onto the sign of the in-phase component of the optical carrier, and the other arm of the MZI encodes one data bit onto the sign of the quadrature-phase component of the optical carrier.

SUMMARY

Various embodiments provide for quadrature amplitude modulation (QAM) of optical carriers. The (QAM) schemes encode more than four signal points onto the optical carrier per coding interval.

In one aspect, an apparatus includes an optical splitter, an optical combiner, first and second optical paths, and a digital signal generator. The optical splitter has an input port and first and second output ports. The optical combiner has first and second input ports and an output port. The first optical path couples the first output port of the optical splitter to the first input port of the optical combiner. The second optical path couples the second output port of the optical splitter to the second input port of the optical combiner. Each optical path includes an electro-optical phase shifter, and one of the optical paths includes an electro-optical attenuator. The digital signal generator is configured to apply binary-valued voltage signals to control inputs of the phase shifters and the attenuator.

In various embodiments, the electro-optical phase shifter is configured to function as a binary phase key encoder.

In another aspect, a method includes splitting an input light beam into mutually coherent first and second light beams, modulating the first and second light beams, and then, recombining the modulated first and second light beams to produce a modulated output light beam. The modulating encodes, at least, two data bits onto the first light beam per coding interval and encodes one or more data bits onto the second light beam per the coding interval. The recombining produces a relative phase shift of $\pi/2$ modulo integer multiples of $\pi$ between the first and second light beams.

BRIEF DESCRIPTION OF THE DRAWINGS

Herein, like reference numerals indicate elements with similar functions.

Illustrative embodiments are described more fully with reference to the accompanying figures and detailed description. The inventions may, however, be embodied in various forms and are not limited to embodiments described herein.

DETAILED DESCRIPTION OF ILLUSTRATIVE EMBODIMENTS

Various embodiments provide for quadrature amplitude modulation (QAM) of an optical carrier. The modulation schemes encode more than two data bits onto the optical carrier per coding interval. The modulation schemes produce optical carriers whose in-phase and quadrature-phase components correspond to the coordinates signal points of QAM constellations with more than four signal points, i.e., constellations capable of representing more than 2 bits.

Herein, a coding interval is a time period over which the data on both in-phase and quadrature-phase components of the optical carrier changes.

Figure 2:
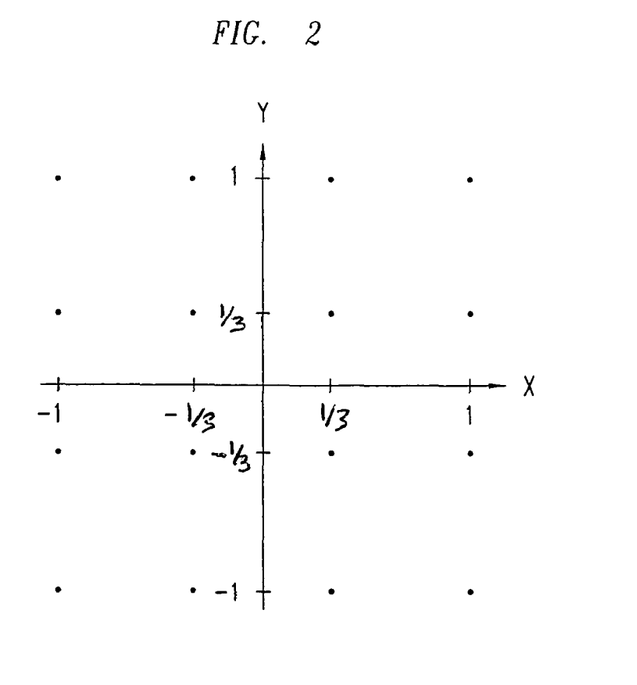
FIG. 2 shows a quadrature amplitude modulation (QAM) constellation that has sixteen signal points.

FIG. 2 shows a QAM constellation having 16 signal points. This QAM constellation has signal points at the points (n/3)x+(m/3)y where "n" and "m" are integers selected from {+1, +3, −1, −3}. For this QAM constellation, the in-phase component of a modulated carrier will correspond to the x-coordinate of a signal point and the quadrature-phase component of the modulated carrier will correspond to the y-coordinate of the signal point. To represent the coordinates of signal points of this QAM constellation, the in-phase and quadrature-phase components of the optical carrier should have a phase with values selected from {0, $\pi$} and amplitudes selected from {A, 3A}.

Figure 3:
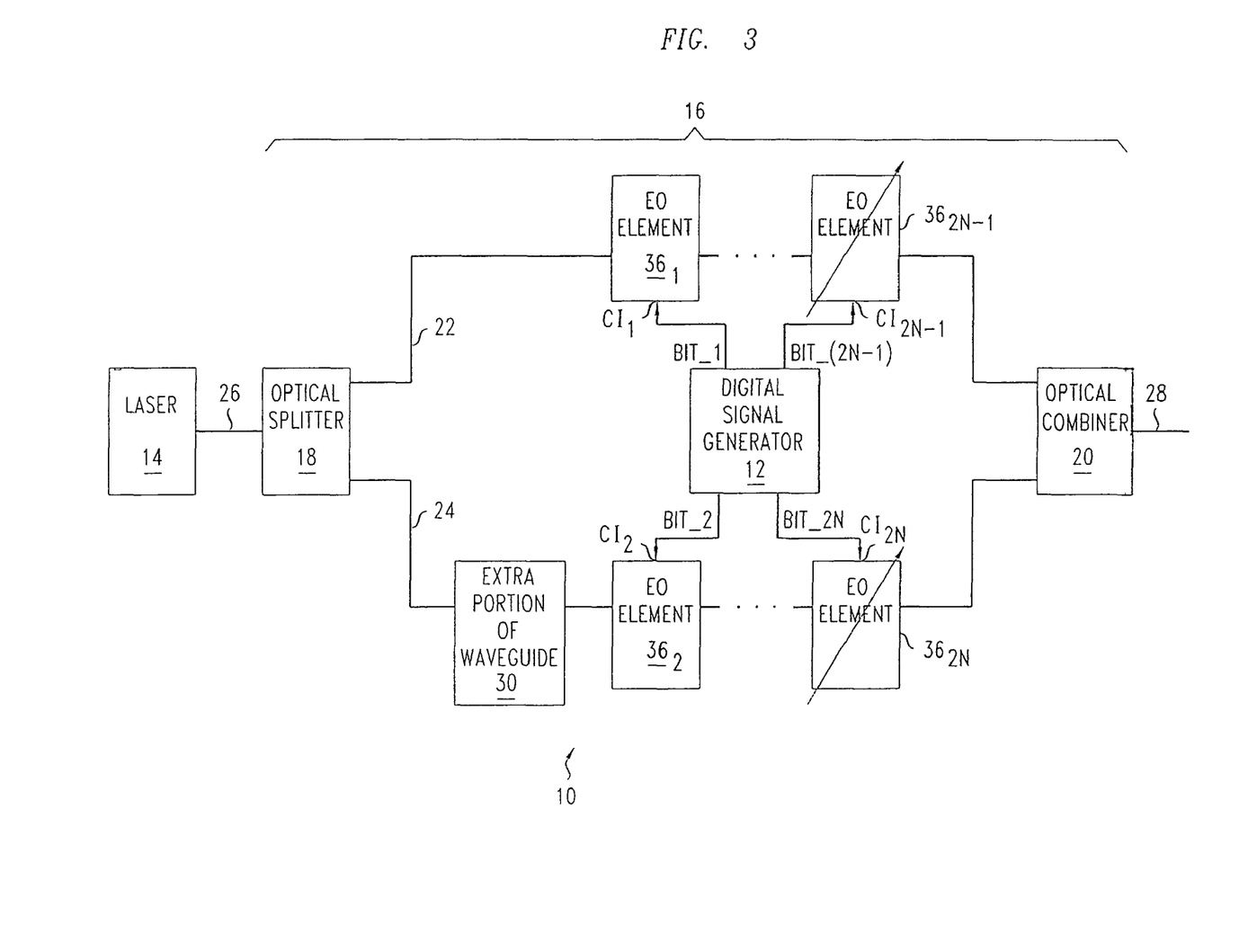
FIG. 3 is a block diagram for a system that modulates an optical carrier according to a QAM constellation with more than four signal points.

FIG. 3 shows a system 10 that encodes (2N) data bits onto an optical carrier during each coding interval where N is an integer equal to or greater than two. The system 10 includes a digital signal generator 12, a laser 14, and an optical modulator 16. The digital signal generator 12 outputs 2N binary-valued voltage signals per coding interval, i.e., Bit_1, Bit_2, . . . Bit_(N−1), and Bit_2N. For each bit "k", the associated voltage signal, Bit_k, takes its voltage values from an appropriate set of two voltages, e.g., {+v, −v}. The laser 14 emits an unmodulated, continuous-wave optical carrier of wavelength, λ. Exemplary lasers 14 include diode lasers. The optical modulator 16 modulates the optical carrier, which is received from the laser 14 at optical input 26, to produce a quadrature amplitude modulated optical carrier at optical output 28. The optical modulator 16 produces a carrier-modulation that is responsive to the 2N binary-valued voltage signals output by the signal generator 12 during each coding interval.

Optical modulator 16 has a set of electrical control inputs $\{CI_1, CI_2, \ldots CI_{2N-1}, CI_{2N}\}$. Each control input $CI_1$-$CI_{2N}$ connects to receive one of the binary data signals, which are output by the digital signal generator 16. Each of the binary data signal functions as a binary-valued control voltage for a corresponding one of the electro-optical (EO) elements in the optical modulator 16, i.e., elements $36_1$-$36_{2N}$. The electro-optical elements $36_1$-$36_{2N}$ of the optical modulator 16 are configured so that no analog conversions are needed in order that the digital data signals produce suitable modulation values on the optical carrier. Avoiding the need to digital-to-analog convert the digital data signal voltages, which are output by digital signal generator 16, is advantageous at high data rates where digital-to-analog converters have complex electronic circuits.

The optical modulator 16 includes an electrically controlled, Mach-Zehnder interferometer. The Mach-Zehnder interferometer has a 1×2 optical splitter 18, a 2×1 optical combiner 20, and electro-optically controlled optical paths 22, 24. The 1×2 optical splitter 14 separates a light beam at optical input 26 into a first light beam that is directed into optical path 22 and a mutually coherent second light beam that is directed into optical path 24. The 2×1 optical combiner 16 recombines modulated first and second light beams, which are output by the optical paths 22, 24, to produce a modulated output light beam at optical output 28. The optical paths 22, 24 include planar or fiber optical waveguide segments and optical devices 30, $36_1$-$36_{2N}$ located between said segments. The optical paths 22, 24 modulate light beams therein in a manner that is responsive to binary-valued data voltage signals received from digital signal generator 12. The optical paths 22, 24 also produce a relative time delay between the originally mutually coherent first and second light beams so that these light beams have a relative phase difference of π/2 upon recombination in 2×1 optical combiner 20, e.g., when no voltages modulate signals on the optical paths 22, 24. Generally, the relative phase difference is π/2 up to an integer multiple of 7. Due to the relative phase difference of π/2, the optical path 22 modulates a component of the light beam from laser 14 that is π/2 out-of-phase with the component modulated by the optical path 24. The relative phase shift π/2 may result from an extra portion of optical waveguide 30 and/or a suitable DC voltage applied to one of the electro-optically controllable waveguide segments of one optical path 22, 24.

Each optical path 22, 24 includes an electro-optical phase shifter $36_1$, $36_2$ and one or more electro-optical attenuators $36_3$-$36_{2N}$.

Each electro-optical phase shifter $36_1$, $36_2$ includes a control input $CI_1$, $CI_2$ and is responsive to voltages applied to the associated control input $CI_1$, $CI_2$. In response to the two voltage values of the binary data signals from signal generator 12, i.e., Bit_1 or Bit_2, the electro-optical phase shifters $36_1$, $36_2$ produce binary phase shift key (BPSK) encoding of data on light at the wavelength of laser 14. That is, the electro-optical phase shifters $36_1$, $36_2$ produce phase shifts of 0 and π without producing substantial attenuation at the laser's wavelength. For each phase shifter $36_1$, $36_2$, the associated binary data signal takes voltage values appropriate to produce such binary phase shifting. The construction of the electro-optical phase shifters $36_1$, $36_2$ causes the specific voltage values of the binary data signals of signal generator 12 to produce these desirable phase shift values. Nevertheless, the set of voltage values for Bit_1 and Bit_2 may differ due to differences between the two electro-optical phase shifters $36_1$, $36_2$. Thus, the phase shifts 0 and π are produced without digital-to-analog conversions of digital data signals from the signal generator 12. The 0 and π phase shifts are desirable, because they generate signal constellations in which signal points are at reflection symmetric positions about the x and y axes. The QAM constellation of FIG. 2 has such reflection symmetries.

Exemplary electro-optical phase shifters $36_1$, $36_2$ for optical BPSK encoding include specially configured Mach-Zehnder interferometers as described below with respect to FIGS. 4A-4B. See also, U.S. Pat. No. 6,711,308 (Herein, '308 patent.), which is incorporated herein by reference in its entirety.

Each electro-optical attenuator $36_3$-$36_{2N}$ includes a control input $CI_3$-$CI_{2N}$ and is responsive to voltages applied to the associated control input $CI_3$-$CI_{2N}$. In response to the two voltage values of binary data signals from signal generator 12, i.e., Bit_3-Bit_2N, each electro-optical attenuator $36_3$-$36_{2N}$ attenuates light of the wavelength of laser 14 without producing a significant change in phase. For each electro-optical attenuator $36_3$-$36_{2N}$, the associated binary data signal takes voltage values appropriate for desired attenuation values. The set of voltage values may be the same for Bit_3-Bit_2N or may differ for Bit_3-Bit_2N due to differences between the two electro-optical attenuators $36_3$-$36_{2N}$. Exemplary optical attenuators $36_3$-$36_{2N}$ include Mach-Zehnder interferometers that are specially configured to produce substantially pure amplitude attenuations as described below with respect to FIGS. 4A-4B.

Each attenuator $36_k$ has a transmission coefficient that takes values from the set $\{T_{+k}, T_{-k}\}$ in response to the respective first and second voltage values of the binary data signals transmitted by signal generator 12 to the control input $CI_k$. Herein, a transmission coefficient is a ratio of a received light amplitude to a transmitted light amplitude at a selected wavelength. The ratios $T_{+k}/T_{-k}$ define the magnitudes of the x and y coordinates of signal points in the QAM constellation generated by system 12.

One embodiment of system 10 modulates the optical carrier according to the QAM constellation of FIG. 2. In this embodiment, each optical path 22, 24 includes a single attenuator $36_3$, $36_4$. To produce the QAM constellation of FIG. 2, the optical attenuators $36_3$, $36_4$ are configured to have optical transmission coefficients $T_{+3}$, $T_{-3}$, $T_{+4}$, and $T_{-4}$ whose ratios approximately, e.g., satisfy: $T_{+3}/T_{-3}=T_{+4}/T_{-4}=3$. Other embodiments have ratios satisfying: $T_{-3}/T_{+3}=T_{+4}/T_{-4}=3$, $T_{+3}/T_{-3}=T_{-4}/T_{+4}=3$, or $T_{-3}/T_{+3}=T_{-4}/T_{+4}=3$. In these various embodiments, the equalities for the ratios have errors of less than 25% and preferably have errors of ±5% or less.

In the embodiment that modulates the optical carrier according to the QAM constellation of FIG. 2, the system 10 includes a digital signal generator 12 that outputs 4-bit data signals per coding interval, i.e., Bit_1, Bit_2, Bit_3, and Bit_4. For each 4-bit data signal, one bit is output on an electrical line connecting to one of the control inputs, $CI_1$-$CI_4$. Each bit of the 4-bit signal has a voltage value that is selected from a set of the appropriate two voltage values, e.g., $\{v_{low}, v_{high}\}$.

Figure 4A:
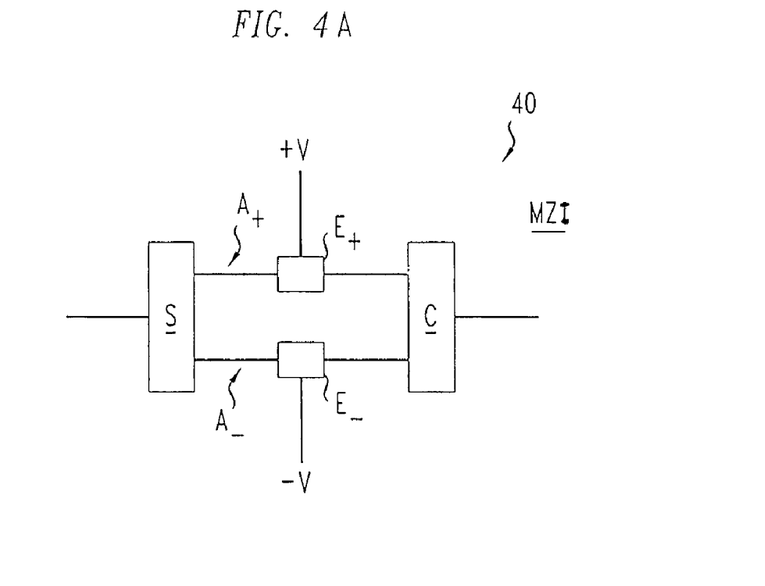
FIG. 4A shows a Mach-Zehnder interferometer for use in a push/pull voltage-biasing mode.
Figure 4B:
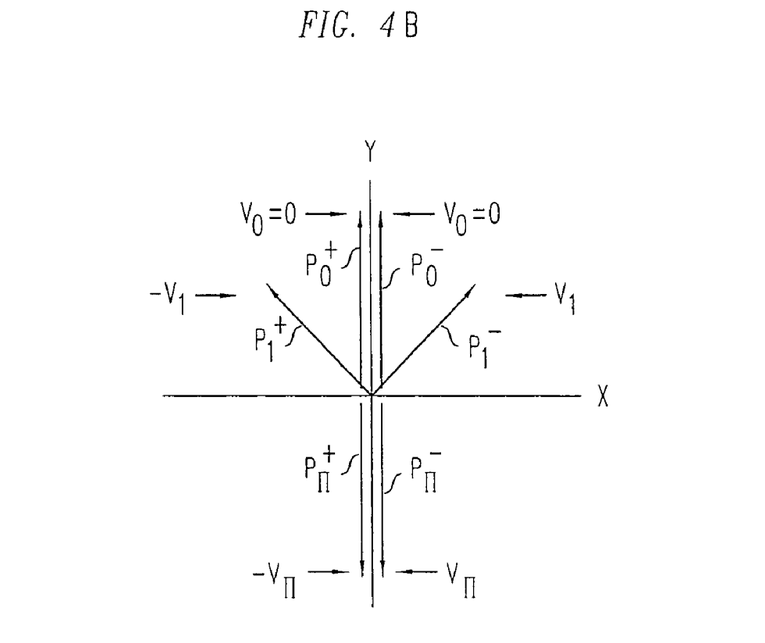
FIG. 4B shows a phasor diagram that illustrates how push/pull voltage biasing operates the Mach-Zehnder interferometer of FIG. 4A.

FIGS. 4A and 4B illustrate how an exemplary Mach-Zehnder interferometer (MZI) 40 may function as an optical BPSK encoder, e.g., electro-optical phase shifters $36_1$, $36_2$ of FIG. 3, or as an electro-optical attenuator, e.g., optical attenuators $36_3$-$36_{2N}$ of FIG. 3. The MZI 40 includes an optical splitter S, an optical combiner C, substantially identical optical paths $A_+$, $A_-$, and substantially identical electro-optical control segments $E_+$, $E_-$. Any difference in optical path length between optical path $A_+$ and optical path $A_-$ is herein, assumed to be compensated by a DC bias voltage that is applied to one of the electro-optical control segments $E_+$, $E_-$. The optical splitter S splits the power of an optical input signal equally between two optical outputs. The optical combiner C combines optical signals, which are received from its two optical inputs, with equal weights to produce an optical output signal.

To produce an optical BPSK encoder or a pure optical attenuator, electro-optical control segments $E_+$, $E_-$ are operated in push/pull AC biasing mode. In this mode, electro-optical control segment $E_+$ receives a control voltage, +V, and electro-optical control segment $E_-$ receives a control voltage, −V. That is, control voltages of equal magnitude and opposite sign are applied to the substantially identical electro-optical control segments $E_+$ and $E_-$. For example, the control voltage of opposite sign, −V, may, e.g., be produced from original control voltage "+V" by a voltage inverter.

FIG. 4B illustrates push/pull mode operation with pairs of phasors $P^+$, $P^-$. The length and phase of each phasor $P^+$, $P^-$ of a pair corresponds to the amplitude and phase of an optical signals produce by one of the optical paths $A_+$, $A_-$ in push/pull mode operation. Since optical paths $A_+$, $A_-$ are identical and electro-optical control segments $E_+$, $E_-$ are identical, each push/pull voltage biasing state produces a pair of phasors ($P^+$, $P^-$), wherein $|P^+|=|P^-|$ and phase($P^+$)=−phase($P^-$). For that reason, in the push/pull mode, MZI 40 produces an optical output signal, i.e., $P^+ + P^-$, whose phase is either 0 or $\pi$.

In push/pull mode, binary control voltage signals can operate MZI 40 as a pure optical attenuator or as an optical BPSK encoder. For operation as a pure optical attenuator, each electro-optical control segment $E_+$, $E_-$ is constructed to respond to the binary voltage values of digital signal generator 12 by producing a phase shift of less than $\pi/2$ on the optical signals in the associated optical path $A_+$, $A_-$. In FIG. 4B, this is illustrated by binary voltage values Vo and $\pm V_1$ and associated pairs of phasors ($P^+_0$, $P^-_0$) and ($P^+_1$, $P^-_1$). For operation as an optical BPSK encoder, electro-optical control segment $E_+$, $E_-$ are constructed to respond to the same binary voltages by causing optical signals in the associated optical paths $A_+$, $A_-$ to undergo phase shifts of 0 and $\pi$. In FIG. 4B, this is illustrated by the voltage values Vo and $\pm V\pi$ and the associated phasor pairs ($P^+_0$, $P^-_0$) and ($P^+_\pi$, $P^-_\pi$).

Other embodiments (not shown) may have single control-electrode optical modulators for electro-optical phase shifters $36_1$, $36_2$ of FIG. 3, and/or for electro-optical attenuators $36_3$-$36_{2N}$ of FIG. 3 rather than the above-described two control-electrode MZIs 40, which are operated in push/pull mode. For example, a single control-electrode optical modulator that can produce opposite phase shifts in two neighboring optical waveguides is described in U.S. Pat. No. 5,050,948, which is incorporated herein by reference in its entirety.

Figure 5:
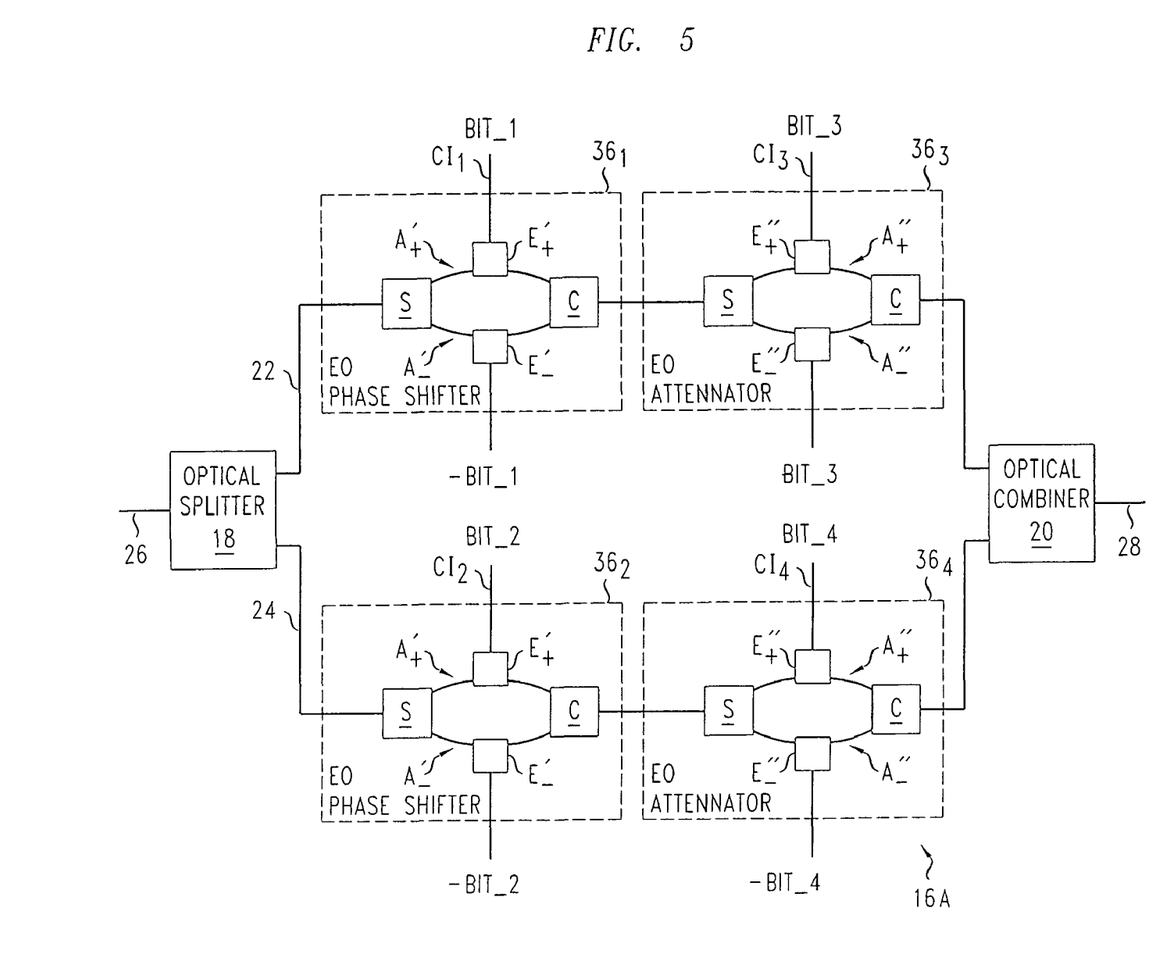
FIG. 5 is a block diagram for a specific embodiment of the optical modulator of FIG. 3 in which an optical carrier is modulated according to the QAM constellation of FIG. 2.

FIG. 5 shows an embodiment 16A of the optical modulator 16 of FIG. 3 that encodes according to the QAM constellation of FIG. 2. In the optical modulator 16A, each electro-optical phase shifter and attenuator $36_1$-$36_4$ includes a Mach-Zehnder interferometer with a 1×2 optical splitter S, a 2×1 optical combiner C, and two substantially identical optical paths, i.e., $A_+'$ and $A_-'$ or $A_+''$ and $A_-''$. The substantially identical optical paths also include substantially identical control segments, i.e., $E_{-+}'$ and $E_-'$ or $E_{-+}''$ and $E_-''$, in which refractive indexes respond to voltages applied to associated control inputs $CI_1$-$CI_4$.

In embodiment 16A, signal generator 12 connects to control segments $E_+'$ and $E_-'$ an electro-optical phase shifter $36_1$, $36_2$ and to control segments control segments $E_+''$ and $E_-''$ of an electro-optical attenuator $36_3$, $36_4$ in a manner that produces push/pull mode operation. In the push/pull mode, each pair of control segments $E_+'$ and $E_-'$ receives opposite sign AC control voltages, and each pair of control segments $E_+''$ and $E_-''$ receives opposite sign AC control voltages. The relative sign inversions may result from connecting two binary outputs of the signal generator 12 directly to the control segment $E_+''$ and $E_+'$ while connecting the same binary outputs to a voltage inverter whose output connects to the corresponding paired control segment $E_-''$ and $E_-'$. Since the paired optical paths $A_+'$ and $A_-'$ are substantially identical, such push/pull application of control voltages ensures that phase shifters $36_1$, $36_2$ cause phase shifts of 0 and/or $\pi$. The electro-optical phase shifters $36_1$, $36_2$ are specifically constructed to cause phase shifts of 0 and $\pi$ to light of the wavelength of laser 14 in response to receiving the binary voltage values produced by digital signal generator 12. Similarly, since the paired optical paths $A_+''$, $A_-''$ are substantially identical, such push/pull application of control voltages ensures that the electro-optical attenuators $36_3$, $36_4$ cause phase shifts of 0 and/or $\pi$. The electro-optical attenuators $36_3$, $36_4$ are specifically constructed to cause phase shifts of 0 on light of the wavelength produced by the laser 14 in response to receiving the binary voltage values produced by the digital signal generator 12. Thus, the MZIs of the phase shifters $36_1$, $36_2$ are constructed to function as optical BPSK encoders for the binary voltage values output by the digital signal generator 12, and the MZIs of the electro-optical attenuators $36_3$, $36_4$ are constructed differently so that they function as pure optical attenuators in response to the same binary voltage values.

In other embodiments (not shown), optical modulator 16A is modified by removing optical attenuator $36_4$ and by connecting the optical output of electro-optical phase shifter $36_2$ directly to one of the optical inputs of optical combiner 20. Such embodiments of optical modulator 16 of FIG. 3 produce an embodiment of system 10 in which 3-bits of digital data are encoded onto the optical carrier per coding interval, i.e., Bit_1, Bit_2, and Bit_3.

Figure 6:
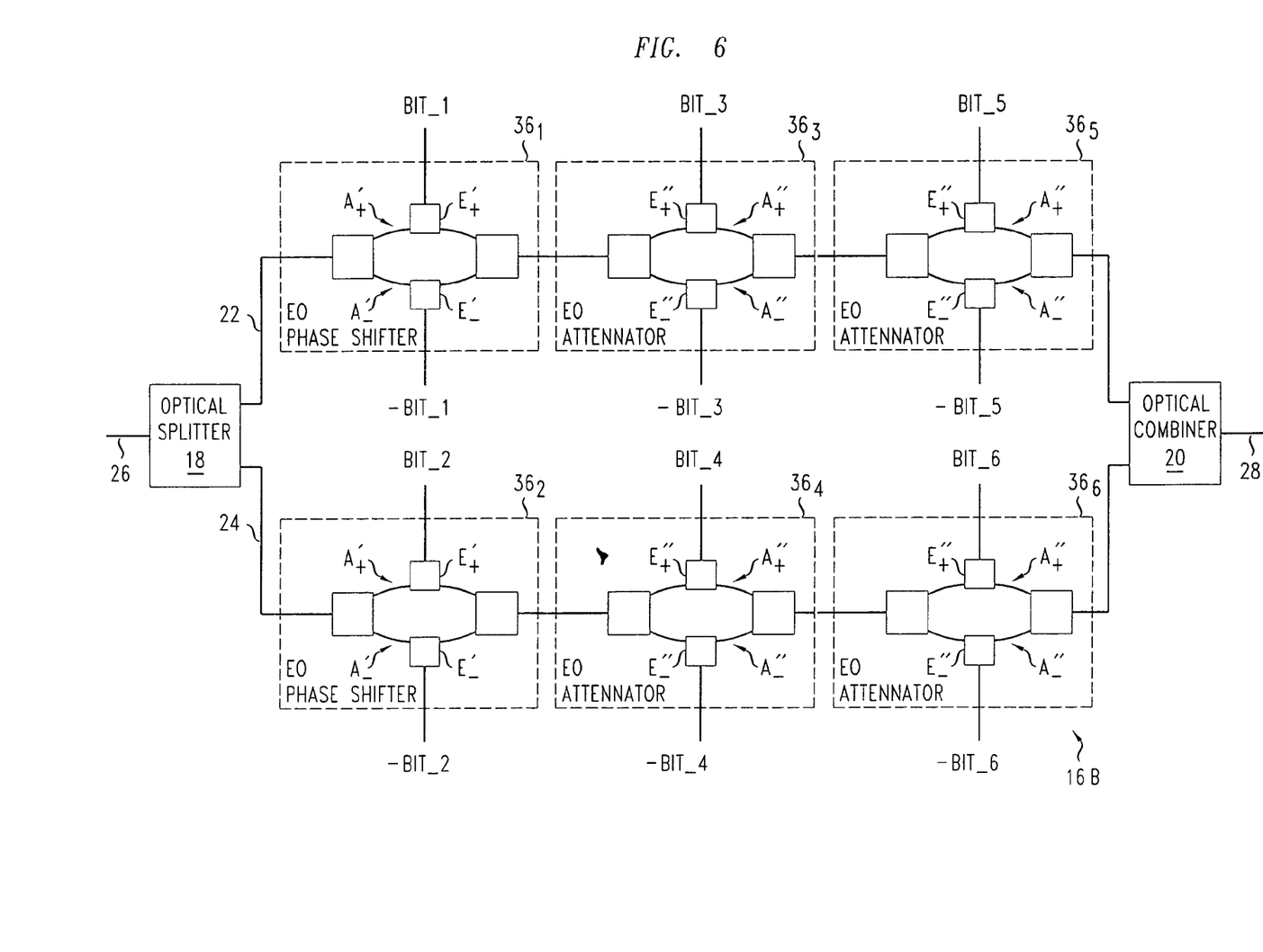
FIG. 6 is a block diagram for another specific embodiment of the optical modulator of FIG. 3 in which an optical carrier is modulated according to a QAM constellation with sixty-four signal points.

FIG. 6 shows another specific embodiment 16B of optical modulator 16 of FIG. 3. The optical modulator 16B is used by an embodiment of system 10 that modulates the optical carrier according to a QAM constellation having sixty-four signal points, i.e., N=3. In the optical modulator 16B, each optical path 22, 24 includes a pair of optical attenuators, i.e., ($36_3$, $36_5$) or ($36_4$, $36_6$). Each electro-optical attenuator $36_3$-$36_6$ is controlled by a corresponding single bit of digital data signal output by signal generator 12. Again, each electro-optical attenuator $36_3$-$36_6$ includes a MZI with a pair of substantially identical optical paths, i.e., ($A_+''$, $A_-''$). In these MZIs, the paired optical paths ($A_+''$, $A_-''$) have substantially identical control segments $E_{-+}''$, $E_-''$. Again, the digital signal generator 12 operates each of these MZIs in a push/pull mode. Thus, in response to the voltage signals from digital signal generator 12, the electro-optical attenuators $36_3$-$36_6$ attenuate optical carriers at the wavelength of laser 14 without producing significant phase shifts thereon.

Figure 7:
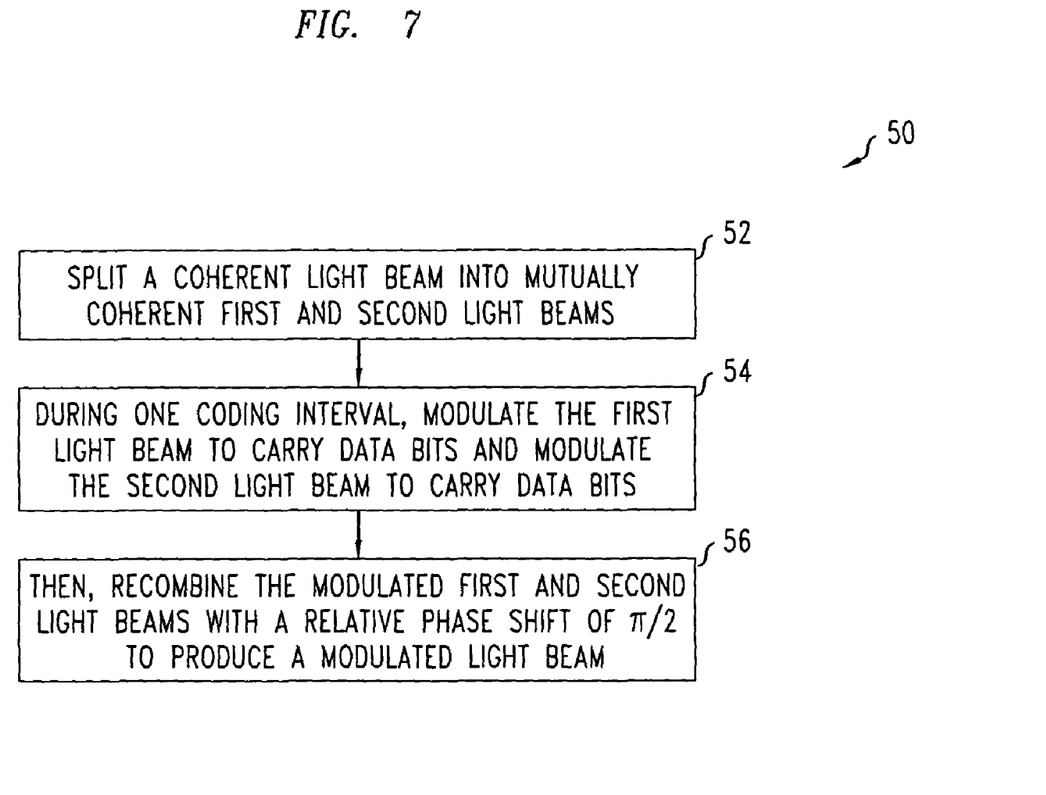
FIG. 7 is a flow chart illustrating a method for performing quadrature amplitude modulation on an optical carrier.

FIG. 7 illustrates a method 50 for modulating an optical carrier to carry more than two bits of data per coding interval, e.g., using optical modulator 16, 16A, 16B of FIG. 3, 5, or 6.

The method 50 produces, e.g., a quadrature modulated optical carrier whose signal points belong to a QAM constellation.

The method 50 includes splitting a coherent light beam into mutually coherent first and second light beams (step 52). After the splitting, light of the first and second light beams propagates along respective first and second optical paths.

The method 50 includes modulating the first light beam to carry one set of data bits during a coding interval and modulating the second light beam to carry another set of data bits during the same coding interval (step 54). For each of the first and second light beams, the modulating step includes a step of electro-optically modulating the phase of the light beam to carry one data bit of the associated set. The step of electro-optically modulating the phase produces a phase shift of 0 or $\pi$ in a manner responsive to the value of the associated data bit, i.e., optical BPSK encoding. For one or both of the first and second light beams, the modulating step includes a step of electro-optically modulating the amplitude of the light beam to carry the remaining one or more data bits of the associated set. The step of electro-optically modulating the amplitude produces an amplitude belonging to a set of values. In an embodiment of method 50 that produces the QAM constellation of FIG. 2, the two amplitude values have a ratio of 3.

The method 50 also includes then, recombining the modulating first and second light beams, e.g., coherently recombining, with a relative phase shift of $\pi/2$ to produce an output modulated light beam (step 56). The relative phase shift ensures that the quadrature component of the output light beam carries ½ of the data bits of a coding interval and that the in-phase component of the output light beam carries the remaining ½ of the data bits of the coding interval.

Other embodiments of the invention will be apparent to those of skill in the art in light of the specification, drawings, and claims of this application.

What we claim is:

1. An apparatus, comprising:
    a Mach-Zehnder interferometer for encoding three or more data bits onto an optical carrier during each coding interval for a symbol, comprising:
        an optical splitter having an input port and first and second output ports,
        an optical combiner having first and second input ports and an output port,
        a first optical path coupling the first output port of the optical splitter to the first input port of the optical combiner; and
        a second optical path coupling the second output port of the optical splitter to the second input port of the optical combiner; and
    a digital signal generator; and
    wherein at least one of the first and second optical paths in the Mach-Zehnder interferometer includes an electro-optical phase shifter and an electro-optical attenuator; and
    wherein the digital signal generator is configured to apply a first set of binary-valued voltage signals to a control input of the phase shifter and a second set of binary-valued voltage signals to a control input of the attenuator.

2. The apparatus of claim 1, wherein each electro-optical phase shifter is configured to function as a binary phase key encoder.

3. The apparatus of claim 2, wherein the other one of the optical paths includes an electro-optical attenuator and the digital signal generator is configured to apply binary-valued voltage signals to a control input of the attenuator of the other one of the optical paths.

4. The apparatus of claim 3, wherein the apparatus is configured to modulate an optical carrier received at the input of the optical splitter according to a QAM constellation in response to the signals applied by the signal generator.

5. The apparatus of claim 4, wherein the QAM constellation has, at least, 16 signal points.

6. The apparatus of claim 3, further comprising a laser positioned to transmit laser light to the input port of the optical splitter; and wherein in response to said digital voltage signals, each of the electro-optical phase shifters is configured to phase shift received light from said laser light between two values that differ by about $\pi$.

7. The apparatus of claim 3, wherein the first and second optical paths are configured such that light beams sent by the optical splitter to the first and second optical paths receive a relative phase shift of about $\pi/2$ up to integer multiples of $\pi$ between being produced in the optical splitter and being recombined in the optical combiner.

8. The apparatus of claim 1, wherein the digital signal generator is configured to cause the Mach-Zehnder interferometer to encode four data bits onto the optical carrier during each coding interval.

9. The apparatus of claim 1, wherein the digital signal generator is configured to cause the Mach-Zehnder interferometer to encode more than four data bits onto the optical carrier during each coding interval.

10. A method for modulating an optical carrier, comprising:
    splitting an input light beam into mutually coherent first and second light beams;
    modulating the first light beam to encode, at least, two data bits thereon per symbol coding interval;
    modulating the second light beam to encode one or more data bits thereon per the symbol coding interval; and
    then, recombining the modulated first and second light beams to produce a modulated output light beam, the recombining producing a nonzero relative phase shift modulo integer multiples of $\pi$ between the first and second light beams; and
    wherein the modulating is such that a value of a first of the data bits determines a modulated phase of one of the first and second light beams during the symbol coding interval and a value of a second of the data bits determines a modulated amplitude of the one of the first and second light beams during the symbol coding interval.

11. The method of claim 10, wherein the modulating is such that a value of a third of the data bits determines a modulated phase of the other one of the first and second light beams during the symbol coding interval and a value of a fourth of the data bits determines a modulated amplitude of the other one of the first and second light beams during the symbol coding interval.

12. The method of claim 10, wherein the two values of the first of the data bits modulate the phase of the one of the first and second light beams by phases that differ by about $\pi$.

13. The method of claim 10, wherein the output light beam is a quadrature amplitude modulated version of the input light beam.

14. The method of claim 13, wherein the modulated output light beam is quadrature amplitude modulated according to a QAM constellation with 16 signal points.

15. The method of claim 13, wherein the modulated output light beam is modulated according to a QAM constellation with more than 16 signal points.

16. The method of claim 10, wherein the nonzero relative phase shift between the first and second light beams is $\pi/2$ modulo integer multiples of $\pi$.

* * * * *